United States Patent
Clark

[19]

[11] Patent Number: 5,980,458
[45] Date of Patent: Nov. 9, 1999

[54] DATA ACQUISITION IN ULTRASONIC IMAGING SYSTEMS USING MULTIPLE, PARALLEL RECEIVE AND TRANSMIT LINES

[75] Inventor: David W. Clark, Windham, N.H.

[73] Assignee: Hewlett-Packard Company, Palo Alto, Calif.

[21] Appl. No.: 09/231,839

[22] Filed: Jan. 15, 1999

[51] Int. Cl.$^6$ .................................................... A61B 8/00
[52] U.S. Cl. ............................................................ 600/437
[58] Field of Search .................................... 600/437, 442, 600/443

[56] References Cited

U.S. PATENT DOCUMENTS

| | | | |
|---|---|---|---|
| 4,694,434 | 9/1987 | Von Ramm et al. | 367/7 |
| 5,462,057 | 10/1995 | Hunt et al. | 128/661 |
| 5,515,852 | 5/1996 | Karp et al. | 600/443 |
| 5,718,230 | 2/1998 | Chapman et al. | 600/443 |

*Primary Examiner*—Scott M. Getzow
*Assistant Examiner*—Maulin Patel

[57] ABSTRACT

A method for attenuating parallel artifacts an ultrasonic acoustic imaging system, including generating a temporal average a plurality of received line acquisitions that laterally and symmetrically transposed with respect to transmitted lines wherein the averages represent received lines with attenuated parallel artifact component. The line acquisitions may be interleaved among a set of frames and directions and a packet of line acquisitions may be performed for each frame. The rate of data acquisition may be increased by executing a plurality of line acquisitions at divergent angles, by generating and providing to a transducer a summation of a plurality of transmitted lines for each line acquisition, or by generating a diverging and spatially separated plurality of transmitted lines for each line acquisition by means of disjoint sub-apertures of the transducer formed of non-overlapping sub-sets of transducer elements. The transmission apertures may be used in sequence with a plurality of concurrent receiving apertures. The maximum time intervals between spatially adjacent line acquisitions may be reduced by use of a plurality of sub-sectors and alternately incrementing and decrementing the receive angle in each sub-sector by a multiple of an angular increment, and by acquisition of packets of lines. The data acquisition rate may also be increased by interleaving line acquisitions among a set of frames and temporal averaging to generate successive updated images.

12 Claims, 8 Drawing Sheets

DATA ACQUISITION IN ULTRASONIC IMAGING SYSTEMS USING MULTIPLE, PARALLEL RECEIVE AND TRANSMIT LINES

TECHNICAL FIELD

The present invention relates to methods and apparatus for increasing the data acquisition rate of an ultrasonic imaging system and, in particular, methods and apparatus for increasing the data acquisition rate of an ultrasonic system using multiple parallel receive lines and multiple transmitted lines.

BACKGROUND ART

Ultrasonic transducers and imaging systems are used in many medical applications and, in particular, for the non-invasive acquisition of images of organs and conditions within a patient, typical examples being the ultrasound imaging of fetuses and the heart. Such systems commonly use a linear or phased array transducer having multiple transmitting and receiving elements to transmit and receive narrowly focused and "steer able" beams, or "lines", of ultrasonic energy into and from the body. The transmitted beams, or lines, are reflected from the body's internal structures as received beams, or lines, that contain information that is used to generate images of the body's internal structures.

In a typical application, such as cardiac scanning, a number of beams or lines are transmitted and received along a plurality of angles forming a sector, that is, a wedge shaped three dimensional volume of interest, wherein the angular width of a sector may be the full range of angles that the transducer is capable of generating and receiving, or a selected portion of that range. The lines of a sector are typically organized into "frames" wherein each frame contains data representing a volume of interest, that is, a sector, and may be further processed or viewed to extract or present the information of interest.

The sequence and timing in which the lines are acquired and the organization of lines into frames often depends upon the particular application and the information desired and is affected by such factors as the dynamics of the information that is being acquired, the time required to transmit and receive a line, the data processing necessary to extract the desired information, and the processing required to generate an image display of the information. For example, in certain types of cardiac scanning the frames may be organized so that each frame contains data representing the sector at a selected point in time in the cardiac cycle so that the dynamic operation of the heart in a volume of interest can then be observed by viewing successive frames.

In many applications, however, these requirements conflict or interact to produce undesirable results. For example, one important application of ultrasonic imaging is color flow mapping wherein doppler information is extracted from the returning signals to generate images, or maps, of blood flow velocity in, for example, the chambers of a heart. Color flow mapping, however, requires multiple data acquisitions, typically 8 to 12 along each line, and the time required for each acquisition along a line is determined by the speed of ultrasound wave in the body and the maximum depth of the volume of interest from the transducer. As a result, one or all of the frame rate, that is, the rate at which data is acquired, the line density, that is, the granularity or sharpness of the map as determined by the number of lines used to generate the map, or the field of view, that is, the angular width and depth of the sector as determined by the number and length of the lines, are compromised.

The ultrasound imaging systems of the prior art, including color flow mapping systems, have addressed this problem in a number of ways, such as allowing the systems to be configured in operate in either or both of the "rapid burst" and "interleaved line" modes.

In the "rapid burst" mode, the system transmits and receives a sequence or set of lines along a single direction, wherein the set of lines along a single direction is referred to as a "packet", and this process is repeated across the sector so that the set of all of the packets of the sector comprise a frame. That is, and to illustrate by a simple example, in a given system each packet may be comprised of four lines in the same direction, so that the lines and packets may be designated as lines A1, A2, A3 and A4 in the A packet, each of which are directed at an angle A, lines B1, B2, B3 and B4 in the B packet, which are directed at an angle B, lines C1, C2, C3 and C4 in the C packet, each of which are directed at an angle C, and so on. A frame is then comprised of all of the lines of the packets A, B, C and so on, while a sector is the total angle of view covered by angles A, B, C, and so on. In the instance of a "rapid burst" system, the lines are transmitted and received in the sequence A1, A2, A3, A4, B1, B2, B3, B4, C1, C2, C3, C4, and so on. Because all of the lines in a given direction, that is, along a given angle, are transmitted and received in a rapid sequence, the "rapid burst" method is advantageous in applications where the condition being observed is changing rapidly, such as in blood flow mapping of regions wherein the blood is fast flowing or wherein it is necessary to identify and map relatively short transients in the blood flow. In this instance, a frame represents a relatively small interval in time with respect to the cardiac cycle, but is sufficient in time to show blood movement.

In the "interleaved line mode", the total set of lines per frame is the same as in the rapid burst method but the sequence of transmission and reception of the lines is in a different order from the rapid burst method in that the system interleaves the acquisition of lines in a pattern among a sequence of two or more packets. Illustrating the "interleaved line mode" by means of the same example as just discussed for the rapid burst method, the sequence of transmission and reception of lines could be, for example, A1, B1, C1, A2, B2, C2, A3, B3, C3, and so on. As a consequence, interleaving reduces the pulse repetition rate in each direction, that is, the rate at which lines are transmitted and received in a given direction, but does so while acquiring the same total number lines in the same interval as does the rapid burst mode. This approach may be used, for example, where the condition being observed is relatively stable or changes relatively slowly, such as in blood flow mapping in regions where blood is moving relatively slowly. In such situations longer sampling times are necessary in order to observe blood movement and interleaving allows more time for the blood to move between "looks" in each direction while not affecting the frame rate.

A significant limitation of systems requiring multiple acquisitions along each line, however, such as in blood flow mapping systems or in B-mode systems operating with multiple transmit focus depths, is that the requirement for multiple acquisitions along each line limits the number of lines that can be acquired in an allowable time, even using "rapid burst" or "interleaved line" operation, thereby limiting the data acquisition rate of the system and, for example, the system resolution.

More recent blood flow mapping systems have therefore used a "parallel line" method wherein each transmission and reception is comprised of a single transmitted line and multiple received lines and wherein the term "parallel" refers to the simultaneous or concurrent reception of multiple lines. The received lines are typically offset to either side of but straddling the transmitted line, thereby increasing the density of acquired lines and, as a consequence, the resolution of the acquired data. This method may be used in conjunction with the "rapid burst" or "interleaved line" modes of operation and, as presently implemented, typically provides two or four received lines for each transmitted line, referred to respectively as two way and four way parallel receive systems.

The parallel line method of operation, however, is susceptible to "parallel artifacts", which appear in the displayed image as periodic gain variations in the lateral direction across the image, that is, as strong, weak, strong, weak, and so on, variations in the image. While the variation can be slight, for example on the order of 1 dB, the variation is very noticeable in the image because it is periodic and because it is fixed, relative to the to transducer, rather than moving with the tissues or fluids being imaged.

Parallel artifacts are typically caused by asymmetric shading of the transducer aperture and a consequent asymmetric variation in the transmitted signal strength by, for example, a rib or an air bubble. The asymmetric shading of the transducer aperture, in turn, causes an apparent shift in the origin of the transmit lines on the aperture while the foci of the transmitted lines remain in their correct, original position in space, thereby causing the transmit lines to effectively pivot slightly around their foci. The receive lines, however, are continuously focused in the typical system and are thereby not affected and do not pivot around their foci. The round trip gain of a line signal increases when the transmit directions are closer to the receive directions and decreases when the transmit directions are farther from the receive directions, so that when the transmit lines pivot around their foci there is a resulting periodic strong/weak parallel artifact that swaps from strong to weak and the reverse at the transmit focal depth.

There are yet other parallel artifacts which arise because the direction of the round-trip path of a transmitted and received line is the combination of and lies between the transmit and receive directions. Typically, the receive lines are over-steered to direct the round-trip lines in the desired directions, but the parallel round-trip beam shapes still have mirror symmetry rather than translational symmetry. As a consequence, a target or region forming an image or part of an image that moves laterally with a constant velocity moves through the image in a slightly non-uniform way, somewhat like an inchworm, and causes a moving image to appear as if it was viewed through rippled glass. As with the first described parallel artifact, this is very noticeable because it is periodic and does not move along with the tissues or fluids being imaged.

The systems of the prior art using multiple, parallel received lines have attempted to eliminate or reduce the affects of parallel artifacts by the use of lateral spatial filters with equal weighting for odd and even lines to attenuate the artifacts. As is well understood in the art, spatial filtering utilizes periodicity of data in space, such as provided by the evenly spaced received lines of a scanning ultrasound transducer, to attenuate unwanted affects at one point in space by, in effect, averaging the data at that one point in space with data acquired from one or more periodically adjacent points in space. This approach has been somewhat successful in systems using two way parallel receive systems, but the method effectively reduces the resolution of the data and results in degraded or blurred images. While the results of spatial filtering are undesirable but acceptable for many applications in two way parallel receive systems, the degradation and blurring of the image in four way parallel receive systems is unacceptable.

The present invention provides a solution to these and other problems of the prior art.

DISCLOSURE OF INVENTION

The present invention is directed to a method for attenuating parallel artifacts in received image scan lines in an ultrasonic acoustic imaging system that includes a transducer and a signal generator with lineforming logic for forming transmitted lines of ultrasonic energy and, for each transmitted line, for receiving a plurality of parallel received lines containing information for generating images, and a processor for processing the received lines to generate the images.

According to the present invention, the method for attenuating parallel artifacts includes the execution of a plurality of line acquisitions wherein each line acquisition includes the transmission of a transmitted line and the receiving of a corresponding plurality of parallel received lines. For each received line of each plurality of parallel received lines, a temporal moving average is generated among receiving lines that are laterally and symmetrically transposed with respect to adjacent transmitted lines wherein the temporal average for each received line represents the received line with an attenuated component from any parallel artifact present in the received line.

In a further aspect of a presently preferred embodiment of the invention, the line acquisitions are interleaved among a set of frames wherein each frame contains image data representing a volume of interest along a given angle of received lines and at successive times and the directions of the transmitted lines are interleaved among the set of frames while the direction of each plurality of parallel received lines is fixed with respect to a corresponding transmitted line.

In a yet further aspect of the present invention, a plurality of line acquisitions forming a packet of line acquisitions is performed for each of the frames in turn and each of the line acquisitions is stored in a memory to be subsequently read from the memory according to the sets of frames for use in the temporal filtering.

In yet further aspects of the present invention, the method of the present invention may be implemented by providing the temporal average of each received line to an image processor for generating the image or by first processing the received lines to generate image data wherein the image data is represented by processed received lines and then using each processed received line for the generation, for each processed received line, of the temporal moving average among the corresponding laterally and symmetrically transposed received lines.

The present invention further includes a method for increasing the rate of acquisition of data used for the generation of image data in color flow imaging by increasing the rate of generation of transmitted lines. According to the present invention, this method includes executing a plurality of line acquisitions wherein each line acquisition includes the transmission of a plurality of transmitted lines at divergent angles and the receiving of at least one received line for and corresponding to each transmitted line, storing the received lines of each of the line acquisitions in a memory, reading the stored received lines from the memory in a spatial sequence determined by the angle of each received line, and using the received lines for the generation of a color flow image.

The method of the present invention for increasing the rate of generation of transmitted lines in an ultrasonic imaging system may be implemented in a variety of ways. In a system having linear transmitting circuits, the method may be implemented by generating a summation of the plurality of transmitted lines for each line acquisition and providing each summation of a plurality of transmitted lines to the transducer for concurrent transmission by the transducer.

The method may also be implemented by generating a diverging and spatially separated plurality of transmitted lines for each line acquisition by selecting a disjoint sub-aperture of the transducer for each transmitted line of the line acquisition wherein the disjoint sub-apertures of a the transmitted lines are formed of non-overlapping sub-sets of transducer elements and wherein each disjoint sub-aperture is then used to transmit a corresponding transmitted line. The receive lines need not use disjoint transducer sub-apertures and the receive apertures can overlap or be identical.

The method of the present invention for increasing the rate of generation of transmitted lines in an ultrasonic imaging system may also be implemented by generating a diverging and temporally separated plurality of transmitted lines for each line acquisition by forming a plurality of transmission apertures formed of elements of the transducer wherein each transmission aperture is for and corresponds to a transmitted line of the line acquisition. The transmission apertures are then used in a sequence to transmit the corresponding transmitted lines of the line acquisition. A plurality of concurrent receiving apertures are then formed of elements of the transducer and the received lines are received simultaneously wherein the data representing the received lines is received in the same sequence as the corresponding transmitted lines but shifted in time by the interval between the transmissions of the transmitted lines.

The method of the present invention for increasing the rate of generation of transmitted lines in an ultrasonic imaging system may further include a method for reducing the maximum time intervals between spatially adjacent line acquisitions. According to this aspect of the present invention, the total range of angles to be scanned by transmitted and received lines is apportioned into a plurality of sub-sectors wherein each sub-sector corresponds to a transmitted line of the plurality of transmitted lines in each line acquisition so a transmitted line is transmitted and the corresponding at least one received line is received in each sub-sector in each line acquisition. The initial line acquisition in each sub-sector is performed along a predetermined initial angle within the sub-sector and in each successive line acquisition the angle of the transmitted line and the at least one received line in each sub-sector is alternately incremented and decremented by a successive multiple of an angular increment until the total range of angles to be scanned have been scanned.

In a still further aspect of the present invention for increasing the rate of generation of transmitted lines in an ultrasonic imaging system, each line acquisition may include the transmission of a packet of line acquisitions wherein each packet of line acquisitions includes the transmission of a plurality of transmitted lines at divergent angles and the receiving of the corresponding received lines.

The present invention further includes a method for increasing the rate of acquisition of data used for the generation of image data by interleaving line acquisitions among a set of frames wherein a plurality of line acquisitions are performed in each of the frames in turn with the line acquisitions being interleaved among the frames. The line acquisitions are stored, with a frame set of the stored line acquisitions being updated during each frame, and the system performs temporal averaging of the line acquisitions of the set of frames to generate successive images from the stored line acquisitions each time the line acquisitions are updated.

Other features, objects and advantages of the present invention will be understood by those of ordinary skill in the art after reading the following descriptions of a present implementation of the present invention, and after examining the drawings, wherein:

BEST MODE FOR CARRYING OUT THE INVENTION

The following will first briefly describe the problem of parallel artifacts in a parallel line ultrasonic imaging system and a generalized ultrasonic echographic imaging system in which the present invention may be implemented, and will then describe individual aspects of the present invention in detail.

A. General Description of an Ultrasonic Echographic System (FIGS. 1A 1B and 1C)

Figure 1A:
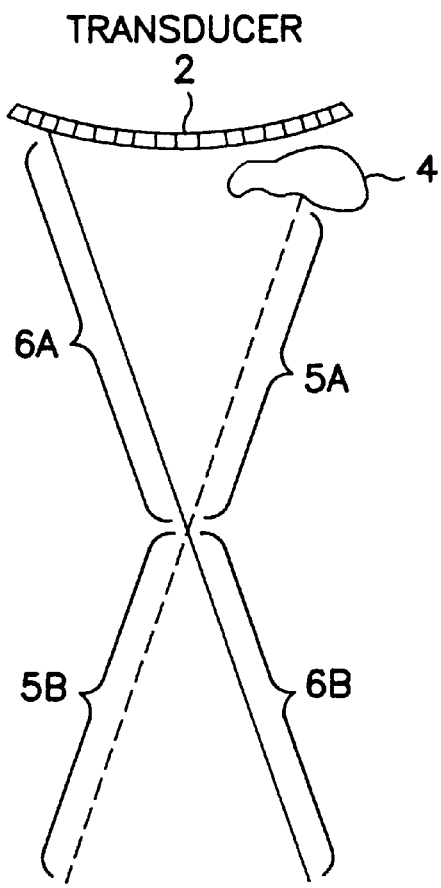
FIG. 1A is a diagrammatic illustration of the operation of a parallel line ultrasonic imaging system.
Figure 1B:
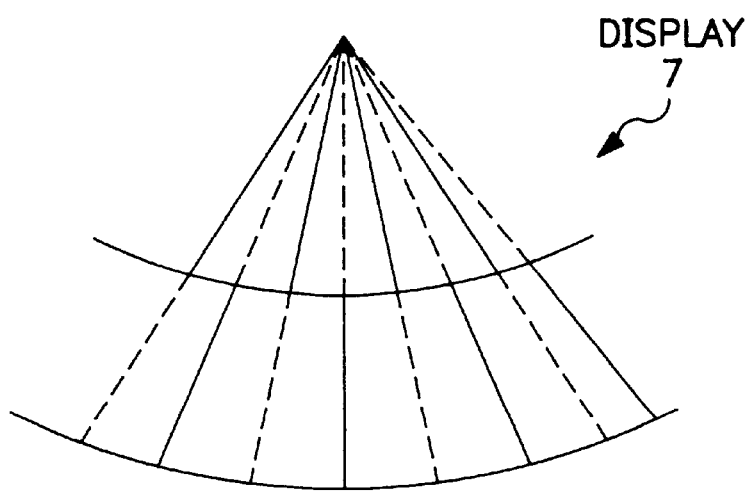
FIG. 1B is a diagrammatic illustration of a data display, or image, resulting from a parallel line imaging system with a parallel artifact.
Figure 1C:
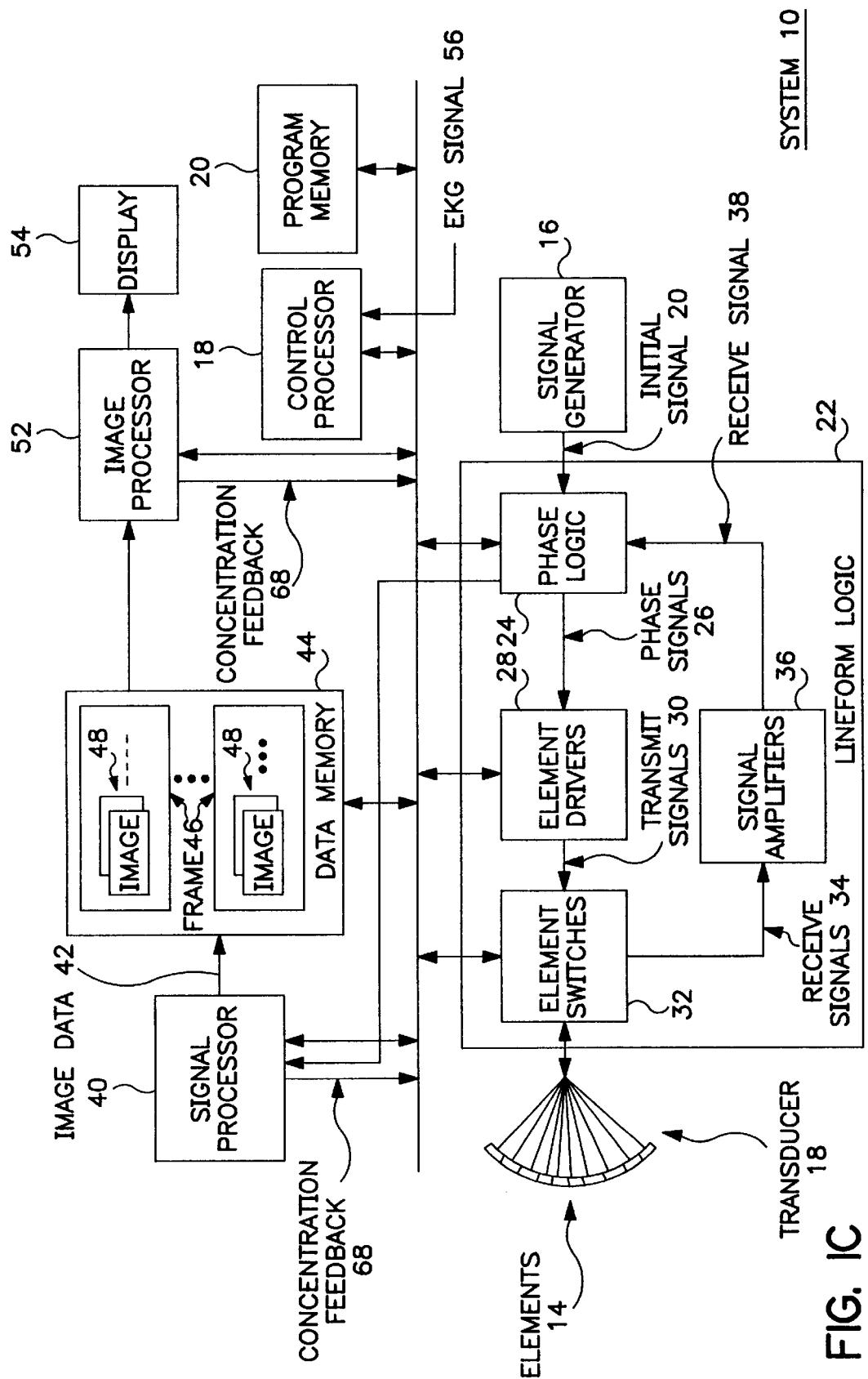
FIG. 1C is a block diagram of an ultrasonic imaging system in which the present invention may be implemented.

Referring to Figs. 1A and 1B, therein is illustrated the problem of parallel artifacts that is addressed by the present invention. FIG. 1A illustrates the operation of an ultrasonic imaging system wherein a Transducer 2 generates a plurality of transmitted/received Lines 3 wherein there is a Source 4 of interference with Lines 3, such as a rib, that interferes with certain of Lines 3 by absorbing or deflecting a portion of the transmitted or received signal strength along the Lines 3 that are subject to the interference.

As has been discussed, the transmitted lines are typically generated with a fixed focus point while the received lines are usually continuously focused, that is, are continuously adjusted to focus at each point in the region of interest, and the transmitted lines and their associated parallel received lines are closely spaced in order to obtain the necessary resolution. The result of the interference by Source 4 is that while the signal strength of Lines 3 is reduced or weakened in Regions 5A and 5B, as indicated by the dashed line representations of Lines 3 in these areas, compared to the signal strength of Lines 3 in Regions 6A and 6B, as indicated by the solid lines represented Lines 3 in these areas, wherein the junction of Regions 5 and 6 is generally located at the focal point of the transmitted lines.

As discussed previously, the resulting asymmetric shading of the transducer aperture and a consequent asymmetric variation in the transmitted signal strength caused by a Source 4, such as a rib or an air bubble, will result in an apparent shift in the origin of the transmit lines on the aperture while the foci of the transmitted lines remain in their original position in space, thereby causing the transmit lines to effectively pivot slightly around their foci. The receive lines, being continuously focused, are not affected, however, and do not pivot around their foci. As a consequence, the round trip gain of a line signal increases when the transmit directions are closer to the receive directions and decreases when the transmit directions are farther from the receive directions, so that when the transmit lines pivot around their foci there is a resulting periodic strong/weak parallel artifact that swaps from strong to weak and the reverse at the transmit focal depth.

The parallel line method of operation is thus is susceptible to "parallel artifacts", which appear in the displayed image as periodic gain variations in the lateral direction across the image, that is, as strong, weak, strong, weak, and so on, variations in the image. While the variation can be slight, for example on the order of 1 dB, the variation is very noticeable in the image because it is periodic and because it is fixed, relative to the to transducer, rather than moving with the tissues or fluids being imaged.

Referring to FIG. 1B, therein is illustrated the consequences of the above described variation of Line 3 signal strength between Regions 5 and 6 resulting from interference by Source 4. As represented therein, the resulting Image Display 7, which is essentially an image comprised of received Lines 3, contains "parallel artifacts" which appear in the displayed image as "bars" of degraded or missing data, which are represented in FIG. 1B as the dashed display lines and that correspond to the portions of the image generated from the data received from Regions 5A and 5B.

As has also been discussed, there are yet other parallel artifacts which arise because the direction of the round-trip path of a transmitted and received line is the combination of and lies between the transmit and receive directions. Typically, the receive lines are over-steered to direct the round-trip lines in the desired directions, but the parallel round-trip beam shapes still have mirror symmetry rather than translational symmetry. As a consequence, a target or region forming an image or part of an image that moves laterally with a constant velocity moves through the image in a slightly non-uniform way, somewhat like an inchworm, and causes a moving image to appear as if it was viewed through rippled glass. As with the first described parallel artifact, this is very noticeable because it is periodic and does not move along with the tissues or fluids being imaged.

Referring to FIG. 1C, therein is presented a diagrammatic block diagram of an ultrasonic echographic imaging System 10 in which the present invention may be implemented. It will be appreciated by those of ordinary skill in the relevant arts that System 10 as illustrated in FIG. 1, and the operation thereof as described herein below, is intended to be generally representative of such systems and that any particular system may differ significantly from that shown in FIG. 1, particularly in the details of the construction and operation of such as system. As such, the System 10 represented in FIG. 1 is to be regarded as illustrative and exemplary and not as limiting as regards the invention described herein or its implementations and embodiments or the claims hereto.

As illustrated in FIG. 1, and as is well known and understood in the relevant arts, a typical System 10, such as a Hewlett-Packard Sonos 2500, includes a Transducer 12 for transmitting lines, that is, beams, of ultrasonic energy into a body and receiving the ultrasonic energy reflected or scattered from the internal structures of the body or a contrast agent, including energy at the harmonic and second harmonic frequencies of a contrast agent present in the path of the current line. A Transducer 12 is generally comprised of an array of piezoelectric Elements 14 that may be used individually or in combinations to form and steer the transmitted and received lines of Transducer 12. As is also well understood in the relevant art, the formation of transmitted lines by a Transducer 12 is accomplished by the selection of individual Elements 14 to comprise an aperture for each transmitted or received line and the driving of the selected Elements 14 by signals having selected phase relationships. Received lines are formed in the same manner, except that the received "signal" is comprised of a received signal from each of the selected Elements 14 and the phase relationships of the individual received signals are controlled to form a single received signal forming the received line.

For this purpose, System 10 includes a Signal Generator 16 that may be controlled by a programmed Control Processor 18 operating under control of programs stored in a Program Memory 20 to generate an Initial Signal 20 at a selectable frequency. Initial Signal 20 is provided to Lineform Logic 22 that includes Phase Logic 24 that operates under program control of Control Processor 18 to generate a plurality of Phase Signals 26. There is at least one Phase Signal 26 for each Element 14 of a currently selected aperture of Transducer 12 and Phase Logic 24 controls the phase relationships between the Phase Signals 26 of the current aperture to provide the phase relationships necessary for the line generated by the current aperture. Phase Signals 26 are then provided to Element Drivers 28, which operate under programmed control of Control Processor 16 to amplify Phase Signals 26 to a selectable power level or levels required for the currently generated transmitted line.

The amplified outputs of Element Drivers 28, indicated in FIG. 1 as Transmit Signals 30, are then provided to Element Switches 32 which are essentially demultiplexer/multiplexer switches to route Transmit Signals 30 to the selected ones of Elements 14 forming the current transmit aperture of Transducer 12. The selected Elements 14 then transmit corresponding ultrasonic signals into the body being imaged.

Element Switches 32 also operate under programmed control of Control Processor 18 to form the received lines of a current receiving aperture by routing the incoming Receive Signals 34 from selected Elements 14 through Signal Amplifiers 36 to Phase Logic 24. As is well known the art, the Elements 14 selected to comprise a current receiving aperture are generally the same Elements 14 as form the transmitting aperture, but need not be the same in either number of arrangement.

Phase Logic 24 then operates under programmed control of Control Processor 18 to phase shift and combine the Receive Signals 34 into a Receive Signal 38 that is provided to Signal Processor 40. As is well understood in the relevant arts, Signal Processor 40 may perform a variety of operations upon Receive Signal 38, such as low pass, high pass, and bandpass frequency filtering, separation of the signal into in phase and quadrature components, determination of doppler frequency shifts and analog to digital conversion, to generate a digital Image Data 42 output representing a received image along the current transmitted/received line.

Image Data 42 may then stored in a Data Memory 44 and may be organized as Frames 46 of Images 48 for subsequent display.

Image Data 42 may then be processed further by Image Processor 52, for example, to enhance Images 48 or to form three dimensional arrays of the data from Images 48 to generate still further images, such as different cross sectional views of the cardiac structure, and is displayed through a Display 54.

It will be understood that System 10 may generate other displays and perform yet other functions to display ultrasonic images. For example, System 10 may be used to determine and display doppler information images representing, for example, the rates and patterns of blood flow in the heart chambers and that, in this instance, Images 48 will contain doppler data and that System 10 may generate such user aids as a doppler cursor to indicate the current line and direction therewithin that doppler information is being obtained and displayed for. Also, portions of an Image 48 or a set of Images 48 may be selected and enlarged for display, thereby providing a more detailed display of selected regions of interest represented by the data in Images 48.

It will also be understood that certain of the functions that are described above as controlled by programs executed by Control Processor 18 may also be controlled manually by user input, such as the frequency and power level of the transmitted lines.

B. Attenuation of Parallel Artifacts By Temporal Filtering In A Parallel Receive Line System (FIGS. 2A and 2B)

As has been described, the parallel line method of operation is susceptible to "parallel artifacts" which arise from a variety of causes, such as a source of interference with one or more received lines that degrades the acquired line data and, in particular, parallel artifacts affecting two or more lines shared between adjoining transmitted lines. As also described, the systems of the prior art have used lateral spatial filters to attenuate the artifacts, but spatial filtering generally results in degraded or blurred images that rises to unacceptable levels in newer and higher resolution four way parallel receive systems.

Figure 2A:
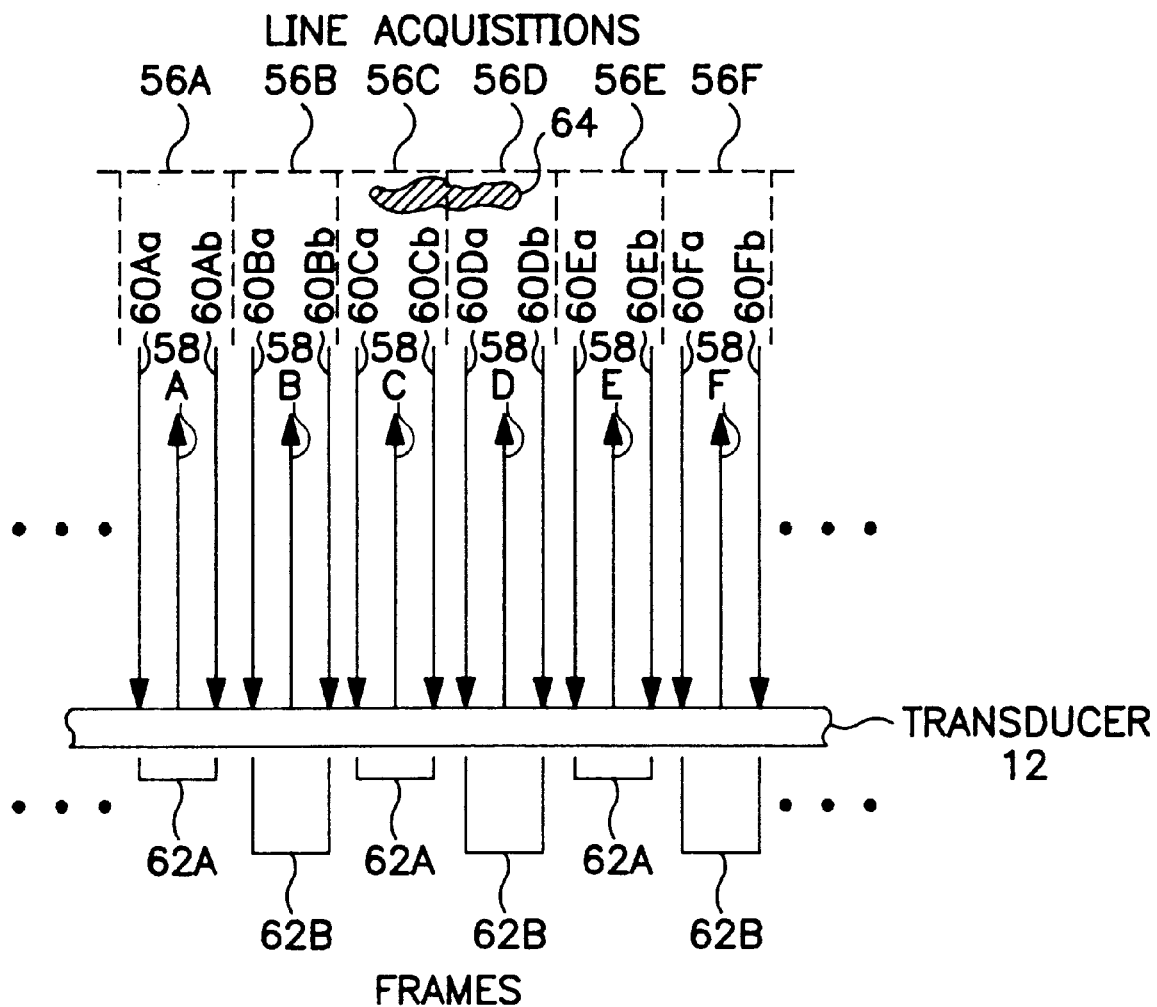
FIGS. 2A and 2B are illustrations of two and four way interleaved parallel receive line data acquisition for temporal filtering and attenuation of parallel artifacts according to the present invention.
Figure 2B:
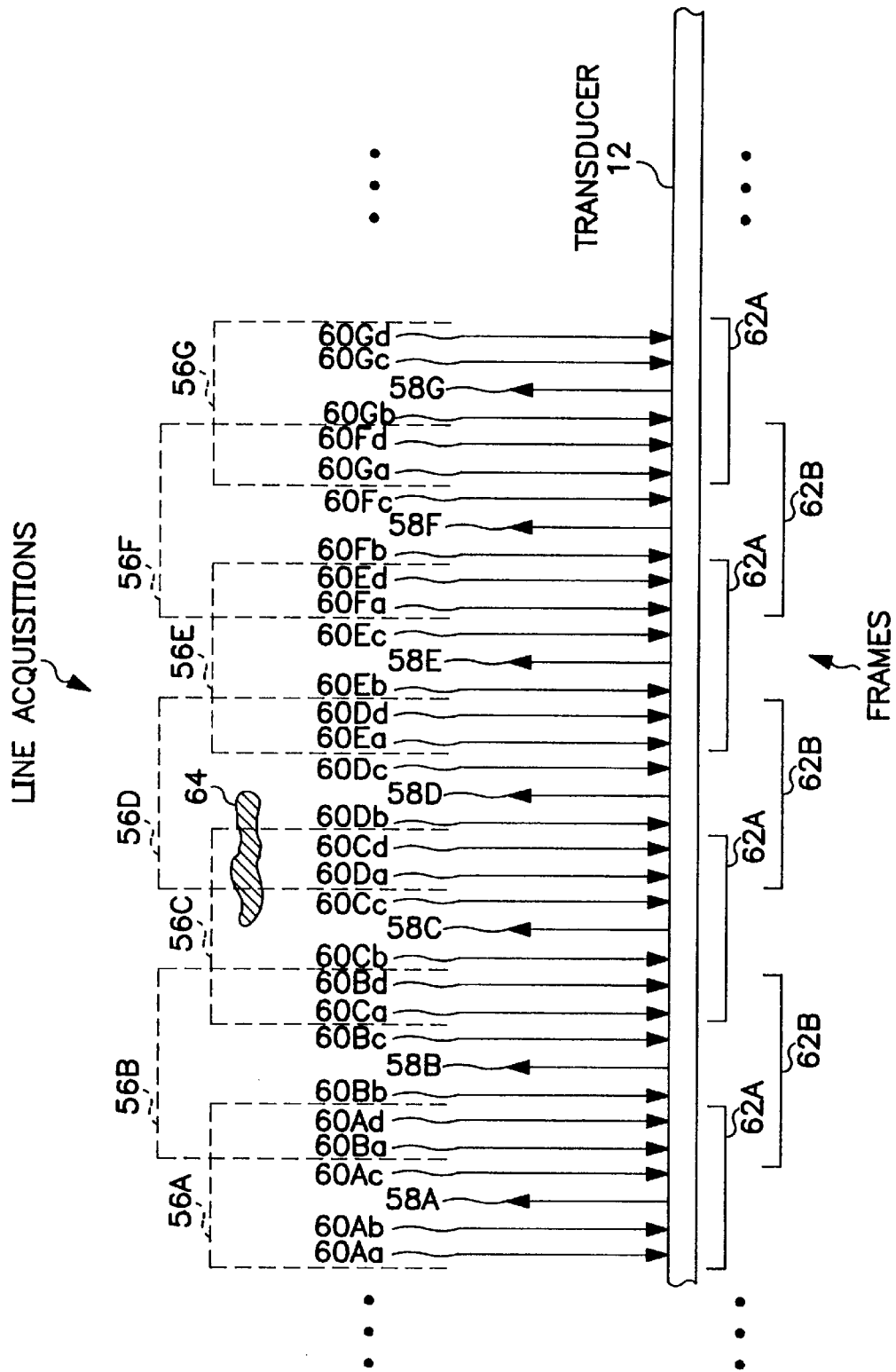

Referring to FIGS. 2A and 2B, therein are respectively illustrated the operation of an implementation of the present invention for attenuating the effects of parallel artifacts in two and four way parallel receive systems wherein the effects of parallel artifacts are attenuated by temporal filtering rather than by spatial filtering, thereby preserving the resolution of the data, that is, the spatial resolution of the lines. It should be noted that the sequences of line acquisitions, frames and transmitted and received lines represented therein are presented in logical and diagrammatic form for purposes of illustration and description of the relationships between transmitted and received lines, line acquisitions and frames and of the operation of the present invention and are not nor are intended to be strict physical representations of the relationships between transmitted and received lines, line acquisitions and frames.

Referring first to FIG. 2A, therein is represented a succession of Line Acquisitions 56 identified as Line Acquisitions 56A, 56B, 56C, and so on, wherein each Line Acquisition 56 is comprised of the transmission of a Transmitted Line 58 and the receiving of two parallel Received lines 60 offset to either side of but straddling the Transmitted Line 58. It will be seen that Transmitted Lines 58 of Line Acquisitions 56 are identified in FIG. 2A as Transmitted Lines 58A, 58B, 58C, and so on, corresponding to Line Acquisitions 56A, 56B, 56C, and so on. The Received Lines 60 corresponding to each Transmitted Line 58 are correspondingly designated as Received Lines 60Aa and 60Ab, 60Ba and 60Bb, and so on, wherein a Received Line 60Xa is the "left" received line of a Transmitted Line 58X and Received Line 60Xb is the "right received line of the Transmitted Line 58X. It will also be understood that it is assumed in FIGS. 2A and 2B, and solely for purposes of illustration, that time increases from left to right, as does the angle of the successive Transmitted Lines 58 within the sector being scanned.

As shown in FIG. 2A, successive Line Acquisitions 56 are interleaved among a set of Frames 62 wherein, for purposes of illustration, the set of Frames 62 is shown in FIG. 2A as including a Frame 62A and a Frame 62B so that successive Line Acquisitions 56 are illustrated as interleaved between two alternate frames. It will be understood, however, that the set of Frames 62 will, in most typical applications, such as blood flow mapping or B-mode scanning, include a greater number of Frames 62 and that FIG. 2A could be correspondingly shown with multiple sets of Frames 62. As will be described below, however, a single pair of Frames 62 is sufficient to illustrate the present implementation as the temporal filtering of the present invention is conducted between pairs of Frames 62 having adjacent angles, or directions, of view.

According to the present invention, and as illustrated in FIG. 2A, the angles, or directions, of Transmitted Lines 58 are interleaved between alternate Frames 62 so that, as illustrated in FIG. 2A, the Transmitted Lines 58A, 58C, 58E, and so on, of Frame 62A will be directed along one angle or direction of view in the sector while the Transmitted Lines 58B, 58D, 58F, and so on, of Frame 62B will be directed along the next angle or direction of view in the sector. It will be noted that for each Transmitted Line 58 the corresponding Received Line 60 will be "over-steered" away from the direction the Transmitted Line 58. That is, and for any given direction of view, when a Transmitted Line 58 is to the left the corresponding Received Line 60 will be over-steered to the right and when the Transmitted Line 58 is to the right the corresponding Received Line 60 will be over-steered to the left. The nominal "round trip" direction of a Transmitted Line 58 and the corresponding Received Line 60, which is the nominal direction of view of the Transmitted Line 58 and corresponding Received Line 60, is thereby the average of the directions of the Transmitted Line 58 and its corresponding Received Line 60. As a result, the nominal round trip direction of each Transmitted Line 58 and corresponding Received Line 60, and thus the angle of view of the Transmitted Line 58 and corresponding Received Line 60, remains fixed between the alternate Frames 62 and the averaging is thereby over round-trip lines that are nominally in the same direction.

In this regard, it will be understood by those of ordinary skill in the relevant arts that, in this application, the term "parallel" as applied to the relative directions of the Transmitted Line 58 and Received Lines 60 is used in a generally descriptive sense and not in a precise, mathematical sense and that lines described herein as being "parallel" in direction are approximately "parallel" rather than exactly parallel in the geometric sense. It will also be remembered and understood that the term "parallel" as used herein also refers to the simultaneous or concurrent reception of multiple lines, such as the concurrent reception of two or four received lines for each transmitted line. The usage of the term "parallel" in any given instance herein will, however, be understood from the context of the term.

Continuing with the present discussion, it will also be understood that the divergence of angle between adjacent Transmitted Lines 58 is relatively small, and, as such, it will be recognized and understood by those of ordinary skill in the relevant arts that the change in the signal received from any given Received Line 60 due to the Received Lines 60 of adjacent Frames being parallel to each other rather than to their respective Transmitted Lines 58 will be relatively small.

It will be seen therefore, and as illustrated in FIG. 2A, that because all Received Lines 60 of adjacent Frames 62 are parallel, the right Receive Line 60Xb of Line Acquisition X will correspond to and will be parallel to and essentially the same as the left Receive Line 60(X+1)a of right adjacent Line Acquisition (X+1). In a like manner, the left Receive Line 60Xa of Line Acquisition 56X will correspond to and will be parallel to and essentially the same as right Receive Line (X−1)b of Line Acquisition 56(X−1), and so on. As a consequence, in any Line Acquisition 56 belonging to a given Frame 62 the signal received from its right receive line will be essentially the same as the signal received by the left receive line of the right adjacent Line Acquisition 56, which is a member of the alternate Frame 62. In a like manner, the signal received from its left receive line will be essentially the same as the signal received by the right receive line of the left adjacent Line Acquisition 56, which is also a member of the alternate Frame 62, and so on.

In summary, therefore, it will be seen that for any Received Line 60 of a Line Acquisition 56 of a given Frame 62 there will be a corresponding laterally and symmetrically mirrored Received Line 60 of a Line Acquisition 56 of another, interleaved Frame 62. Considering the example of a two way parallel receive system illustrated in FIG. 2A, an artifact source such as indicated generally in FIG. 2A as Artifact Source 64 will appear on one of Frames 62 as a "left line" artifact and in the other of Frames 62 as a laterally and symmetrically shifted "right line" artifact and the artifact will be periodic in time, as well as space, because of the periodicity of the Frames 62 and the Line Acquisitions 56 thereof. As a result, the artifact, which is in fact a parallel artifact, now has a temporal periodicity and that temporal periodicity may be used to filter, or attenuate, to reduce the parallel artifact by generating a temporal average of multiple Frames 62.

In the present example of a two way parallel receive system, the temporal average would be performed between Frames 62A and 62B and could be performed, for example, by a two frame moving average filter, or approximated by an IIR filter having a time constant longer than two frames. It should be noted, in this respect, that the temporal averaging filter will not reduce the frame rate, so that the result of the present invention is to preserve the image resolution while attenuating or eliminating the parallel artifact effects and while maintaining the system frame rate. This method does, however, "waste" the Received Lines 60 at the edges of the sector of interest, which reduces the data acquisition rate by 5% or less, which is essentially negligible.

Referring now to FIG. 2B, the present invention is illustrated therein for a four way parallel line system wherein each transmitted line is accompanied by four received lines, designated as Received Lines 60Xa, 60Xb, 60Xc and 60Xd, with two parallel received lines being offset to either side of but straddling the transmitted line. Again, successive Line Acquisitions 56 are interleaved among a set of Frames 62 wherein, for purposes of illustration, the set of Frames 62 is shown in FIG. 2A as including a Frame 62A and a Frame 62B so that successive Line Acquisitions 56 are illustrated as interleaved between two alternate frames. It will be understood, however, as discussed above, that the set of Frames 62 may and generally will include a greater number of Frames 62. Again, however, a single pair of Frames 62 is sufficient to illustrate the present implementation.

As discussed with regard to FIG. 2A, the angles, or directions, of Transmitted Lines 58 are interleaved between alternate Frames 62 so that, as illustrated in FIG. 2A, the Transmitted Lines 58A, 58C, 58E, and so on, of Frame 62A will be directed along one angle or direction of view in the sector while the Transmitted Lines 58B, 58D, 58F, and so on, of Frame 62B will be directed along the next angle or direction of view in the sector. As illustrated in FIG. 2B, the right Received Lines 60Xc and 60Xd associated with a Transmitted Line 58X will be parallel to and essentially the same as, respectively, the left Received Lines 60(X+1)a and 60(X+1)b of the right-hand adjacent Transmitted Line (X+1), and so on. As a consequence, in any Line Acquisition 56 belonging to a given Frame 62 the signal received from its inner and outer right receive lines will be essentially the same as the signal received by, respectively, the left outer and inner receive lines of the right-hand neighboring Line Acquisition 56, which is a member of the alternate Frame 62. In a like manner, the signal received from its left inner and outer receive lines will be essentially the same as the signal received by, respectively, the right outer and inner receive lines of the left-hand neighboring Line Acquisition 56, which is also a member of the alternate Frame 62, and so on.

It was discussed above that the effect of interleaving the transmitted line directions on alternate frames results, in the two way parallel receive system, with each received line switching between a "left" artifact and a "right" artifact so that an artifact has a temporal periodicity as well as a spatial periodicity. In the instance of a four way parallel receive system, as may be seen from FIG. 2B, the received line switching is more complex, switching among left-right and inner-outer artifacts from frame to frame. Again, however, it will be seen that for any Received Line 60 of a Line Acquisition 56 of a given Frame 62 there will be a corresponding laterally and symmetrically mirrored Received Line 60 of a Line Acquisition 56 of another, interleaved Frame 62. It will be noted that in the four way parallel receive system, however, the symmetric transposition of corresponding Received Lines 60 is not only between right and left with respect to the Transmitted Lines 58, but is also between inner and outer Received Lines 60. As discussed with respect to a two way parallel receive system, an artifact will again be periodic in time as well as space and, as a result, the artifact has a temporal periodicity and that may be used to filter, or attenuate, to reduce the parallel artifact by generating a temporal average of the frames.

It was discussed that in a two way parallel receive system, the temporal average would be performed between Frames 62A and 62B and could be performed, for example, by a two frame moving average filter, or approximated by an IIR filter having a time constant longer than two frames. In the instance of a four way parallel receive system, the temporal average can be performed over two frames, as in the two way parallel receive system, but also could be performed over four frames, with four line acquisitions having the transmit line in each of the four directions. A four frame temporal average, however, would require a filter with a slower responsiveness, which may be undesirable in certain applications. It should again be noted, however, that the temporal averaging filter will not reduce the frame rate, so that the result of the present invention is to preserve the image resolution while attenuating or eliminating the parallel artifact affects and while maintaining the system frame rate.

Finally, it should also be noted that certain forms of data processing, such as color flow imaging, significantly reduces the amount of data received, resulting in the previously discussed need for multiple data acquisitions along each line, and, for this reason, it may be preferable to perform the temporal averaging after flow detection to reduce the data storage requirements. In certain instances and applications, however, including color flow imaging, it may be preferable to perform the temporal average of entire frames of "RF" data or intermediate data.

The present method may also be implemented as an interleaved set system in which a set of lines are received in each frame and wherein the sets of lines are interleaved in a manner analogous to an interlaced scan CRT display. In an implementation using two sets of receive lines, for example, which may be referred to as the "even" and "odd" sets of lines, the initial even lines are acquired during a first interval and the initial odd lines are acquired during a second interval and an image is constructed, with averaging between the even and odd lines. The even lines are then re-acquired during a third interval and a next image constructed and the odd lines re-acquired during a fourth interval and the next image constructed, and so on. The interleaved set system thereby improves the spatial resolution of the system without degrading the frame rate or, conversely, improves the frame rate of the system without degrading the spatial resolution of the system.

In an interleaved set system, therefore, the line acquisitions are interleaved among the set of frames or, in an alternated embodiment, by use of the "rapid burst" mode wherein a packet of line acquisitions are performed in each of the frames in turn, so that a set or packet of received lines is acquired in each frame with the sets or packets of lines being interleaved. The sets or packets of lines may be stored, with a frame set of the stored lines being updated during each frame and temporal averaging used to generate successive images from the stored lines each time the images are updated.

It will be noted that an interleaved set system will not show parallel artifacts, unless the system also employs parallel acquisition of received lines as previously described, but will show periodic artifacts, such as motion artifacts, having a periodicity dependent upon the interleaving of the sets of received lines. In the implementation discussed above, for example, wherein the system alternately acquires "even" and "odd" received lines on alternate frames, the periodic artifacts will have a two line and two frame periodicity. The artifact removal method of the present invention, which may be considered to operate as either a spatial filter or a temporal filter, the effects on spatial or temporal artifacts being equivalent, may be employed, however, to eliminate such periodic artifacts.

Figure 2C:
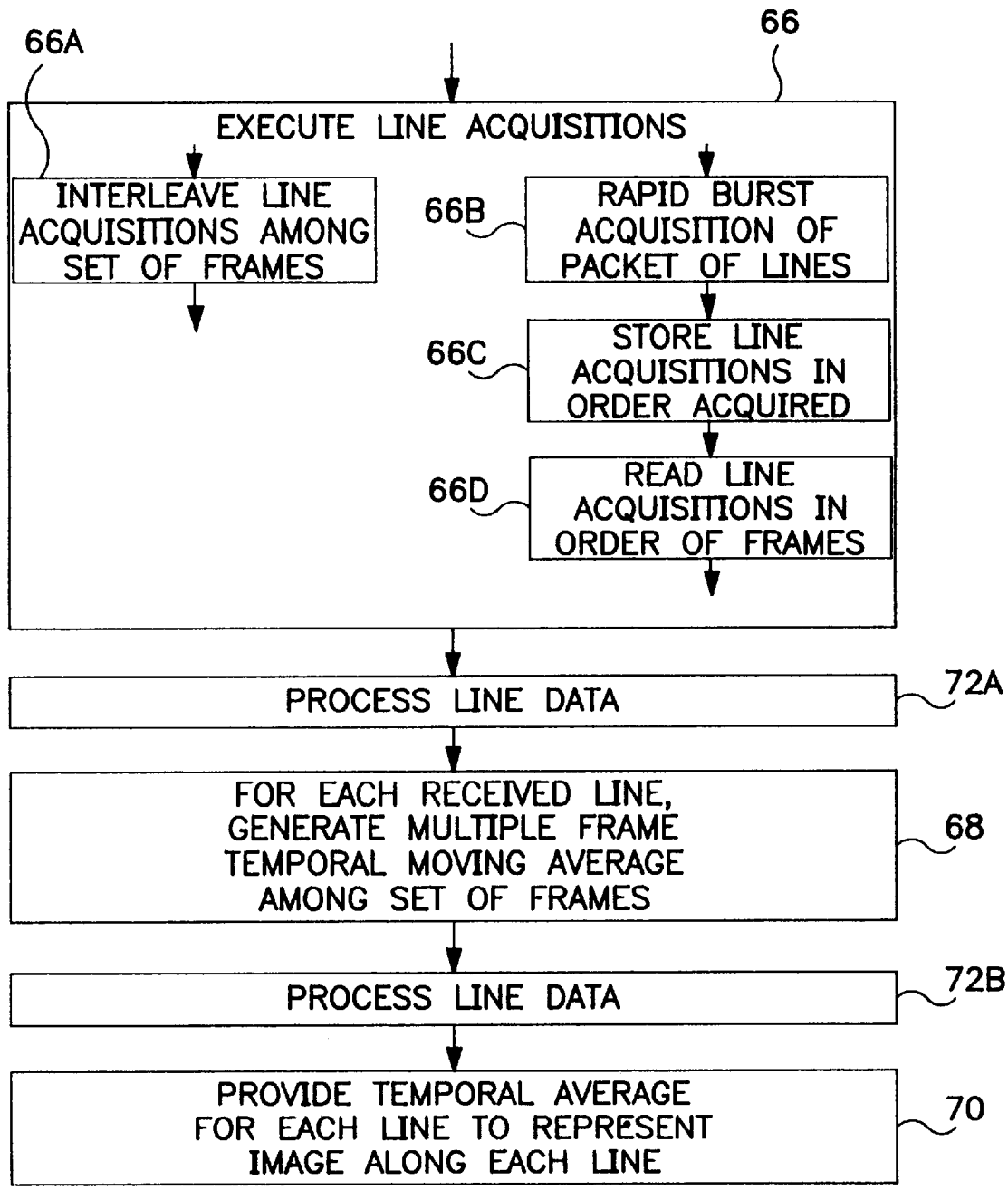
FIG. 2C is a flow chart of the method of the present invention for temporal filtering and attenuation of parallel artifacts in an interleaved set data acquisition system.

The above described method described above for attenuating parallel artifacts in an interleaved set system is summarized in FIG. 2C, which illustrated the method as may be implemented in a System 10.

As shown in FIG. 2C, the method of the present invention as implemented in a presently preferred embodiment in a System 10 or similar system may be described as:

Step 66—execute a plurality of sets of line acquisitions, the sets of line acquisitions being interleaved among a set of frames and each including the receiving of multiple received lines wherein the directions of the sets of received lines are interleaved among the set of frames;

Step 68—for each set of received lines, generate a multiple frame temporal moving average among the set of frames of corresponding laterally and symmetrically transposed received lines; and Step 70—provide the temporal average for each received line as representing the received line with an attenuated component from any artifact present in the received line.

As indicated in FIG. 2C, Step 66 may be performed in either of two manners, that is, by means of a Step 66A wherein the line acquisitions are interleaved among the set of frames or, as indicated in Step 66B, by use of the "rapid burst" mode wherein a packet of line acquisitions are performed in each of the frames in turn. In the latter instance, Step 66B will be accompanied by a Step 66C, wherein each of the line acquisitions are stored in a memory, and a Step 66D, wherein the stored line acquisitions are read from the memory according to sets of frames for purposes of the temporal filtering performed in Step 68.

Also as indicated in FIG. 2C, processing of the line data may be performed in a Step 72A before the temporal filtering operation of Step 68, that is, at the RF or intermediate frequency stage, or in a Step 72B after processing of the line data to extract the information that is to be displayed. As discussed above, performing the data processing in a Step 72B may be advantageous in a color flow processing or a B-mode system wherein the data processing results in a significant reduction in the volume of data, thereby reducing volume of data to be stored and filtered. It will be recognized by those of skill in the relevant arts, however, that the method is not limited to use only in color flow imaging systems, but may be applied in other imaging systems for similar benefits.

B. Parallel Data Acquisition Using Multiple Transmits

As described above, the data acquisition rate of an ultrasound system, such as a color flow system, may be increased by using multiple, parallel receive lines.

The method next described directs multiple concurrent or nearly concurrent transmissions in widely separated directions and receives one or more lines of data around each transmitted line. As presently embodied, the method uses two transmitted lines in each transmission, but may use more, and, when multiple received lines are acquired for each transmitted line, the received lines associated with each transmitted line will generally be "parallel" with one another and with the transmitted line, but need not be depending upon the particular application. This method is thereby capable of effectively multiplying the line acquisition rate with respect to the method described just above, dependent upon the number of transmitted lines in each transmission.

The method by which the transmitted lines are transmitted, that is, concurrently or nearly concurrently, is dependent in part upon the characteristics of the transmitter circuits in a particular system. For example, and assuming for purposes of discussion that each transmission includes two transmitted lines, then the two transmitted line waveforms may be summed and provided to the transducer by the transmitter circuits, if the transmitter circuits are linear. If, however, the circuits are non-linear, the two transmitted lines must be spatially or temporally separated.

Figure 3A:
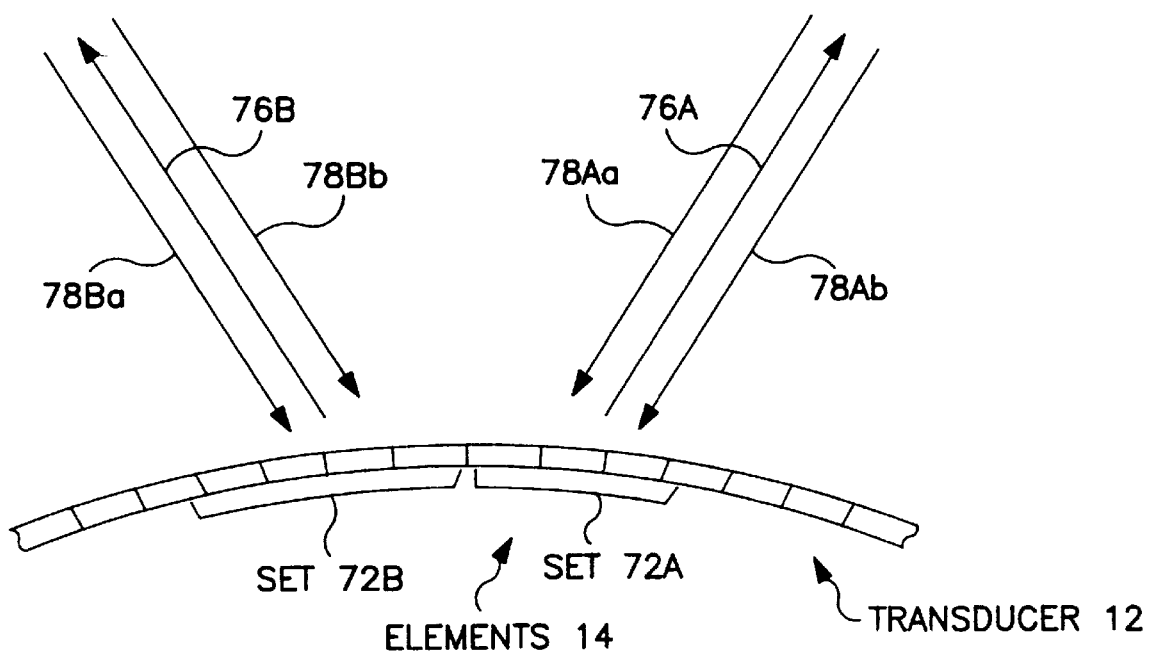
FIG. 3A illustrates parallel data acquisition by multiple concurrent transmission and reception of spatially separated lines according to the present invention.

A spatial separation of the transmitted lines allows the transmitted lines to be transmitted concurrently, that is, at the same time, by using disjoint sub-apertures of the transducer, that is, non-overlapping sub-sets of the transducer elements, and is particularly useful for flat and curved linear transducers. For example, and as illustrated in FIG. 3A, in this instance Lineform Logic 22 uses disjoint Sets 74A and 74B of a Transducer 12's Elements 14 to form the beams of, respectively, Transmitted Lines 76A and 76B which are directed in widely separated directions. After transmission of Transmitted Lines 76A and 76B, Lineform Logic 22 uses Elements 14 to form the beams of the respective corresponding parallel Received Lines 78Aa, 78Ab, 78Ba and 78Bb. In this regard, it should be noted that while transmit circuitry and transducer nonlinearities make it difficult to use a given aperture for the simultaneous transmission of a plurality of lines, these limitations generally do not prevent the use of a given single aperture for the simultaneous reception of multiple lines as multiple simultaneous receive lines can be generated by the combination of variously delayed versions of the signals from the transducer elements. As such, it is not necessary to use disjoint sub-apertures to receive the receive lines and the receiving apertures may overlap or even be identical.

A temporal separation of the transmitted lines, wherein the transmitted lines are transmitted sequentially and as close together in time as the system can achieve, allows the entire aperture of the transducer, that is, all of the transducer elements, to be used in generating the transmitted line and the received lines are likewise acquired by the entirety of the transducer elements and are separated, or formed, by appropriate delays.

Figure 3B:
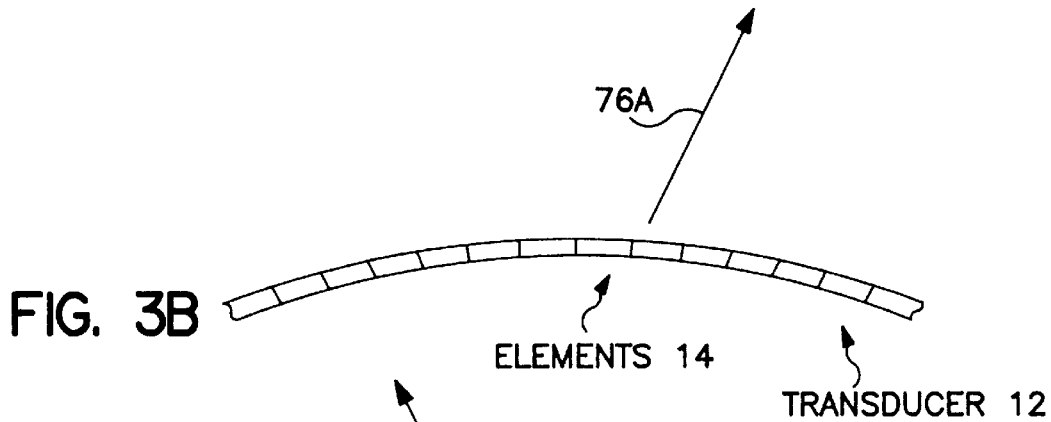
FIGS. 3B through 3D illustrate data acquisition by temporal separation of transmitted and received lines according to the present invention; and, FIG. 4 illustrates data acquisition by non-consecutive scanning of multiple angularly spaced lines in angular sub-sectors according to the present invention.
Figure 3C:
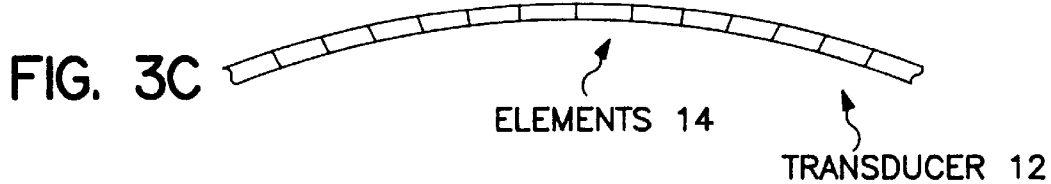
Figure 3D:
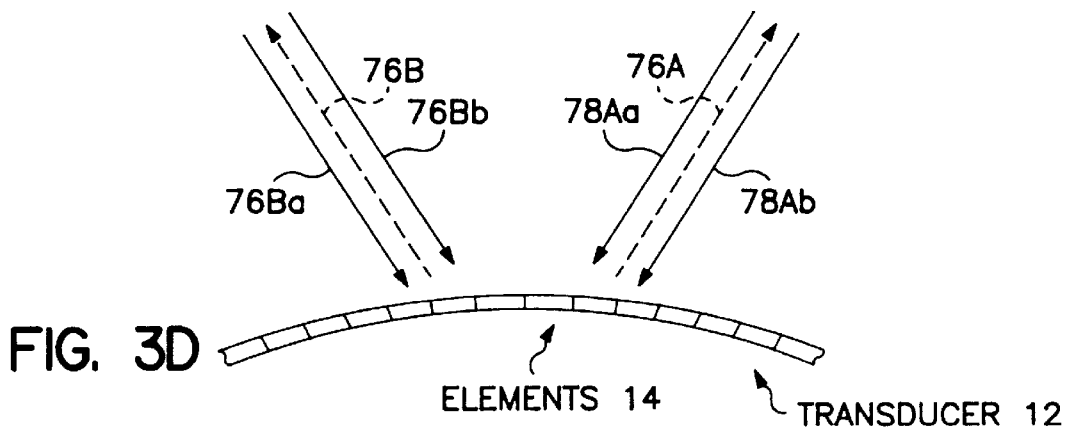

An example of temporal separation of transmitted and received lines illustrated in FIGS. 3B, 3C and 3D, which illustrate the operation of Lineform Logic 22 at three sequential points in time. As illustrated in FIG. 3B, the Elements 14 of Transducer 12 are used at a first point in time to form a single aperture for the transmission of a first Transmitted Line 76A. Then, and in quick succession after the first point in time, Elements 14 of Transducer 12 are used as illustrated in FIG. 3C at a second point in time to form a single aperture for the transmission of a second Transmitted Line 76B. Then, at a third point in time represented in FIG. 3D, Elements 14 are used to form two apertures concurrently for the parallel reception of, respectively, parallel Received Lines 768a and 78Ab, corresponding to Transmitted Line 76A, and parallel Received Lines 78Ba and 78Bb, corresponding to Transmitted Line 76B. In this regard, it will be noted that while the two receive apertures are formed simultaneously, the actual data received from the Received Lines 78Ba, 78Bb aperture and corresponding to Received Lines 78Ba and 78Bb will be skewed or shifted in time with respect to the actual data received from the Received Lines 78Aa, 78Ab aperture and corresponding to Received Lines 78Aa and 78Ab wherein the skew or shift in time will correspond to interval between the transmissions of Transmitted Lines 76A and 76B.

Finally, it should be noted that temporal separation is probably more appropriate for sector transducers as sequential transmissions render the sector apex unusable for shallow imaging, that is, close range imaging wherein the maximum depth of the apex of the beamforming elements is desirable, because the return from a first transmission cannot be received during the actual transmission of a second transmission. This is less of a limitation in sector transducers, however, because the narrowness of the sector image near the apex makes sector transducers less suitable for shallow imaging. Also, it should be noted that shallow imaging is generally of less significance in applications using the parallel receive line method because the frame rate tends to be high for very shallow imaging, thereby reducing the need for parallel operation.

It will be appreciated by those of ordinary skill in the arts that either of the above described methods for transmitting multiple concurrent or nearly concurrent transmissions in widely separate directions and receiving one or more lines of data around each transmitted line can be utilized in conjunction with other methods for increasing the rate of data acquisition, such as in Step 66 of the parallel received line method illustrated in FIG. 2C. It will also be appreciated, however, that the method of multiple transmissions described herein may result in interference between beams due to "leakage" between a transmitted line and the received lines of other transmitted lines; that is, a primary lobe or a sidelobe of a transmission may overlap with the primary lobe or a sidelobe of a receiving line of a concurrent transmission. For this reason, the method just described will probably most often be used with, for example, color flow systems or other systems that are provided with clutter filters to eliminate slow or non-moving components of received signals.

Lastly, it must be noted that the simultaneous or near simultaneous transmission and reception of two or more lines at widely separated directions, or angles, may require that the system process the lines in non-consecutive order through the spatial region of interest and corresponding alterations is lateral spatial filtering. The individual lines may, of course, be processed in any order, and any re-ordering or re-sequencing of the received lines, for example, for temporal filtering of parallel lines as described above, may be achieved by storing the received lines and reading the processing the lines in the desired order. It will be recognized, however, that any non-sequential processing of lines and any re-ordering of the received lines should be performed in such a manner as to avoid a result wherein successive sectors are "painted" differently in space and so that the imaging plane does not change with time due to the non-sequential processing or the re-ordering of lines.

C. Non-Consecutive Scanning of Widely Spaced Multiple Transmits

It will be noted with regard to the above described method for data acquisition by widely spaced transmissions that if the transmitted lines are scanned through the sector monotonically, there would result a significant gap in time where the last acquisition of one half-sector is adjacent to the earlier first acquisition of the other half-sector. That is, for at least certain portions of the sector there would be significant periods between successive scans by one line or the other. These gaps is scanning would, in turn, result in visible discontinuities in the data and the resulting image in, for example, color flow imaging, particularly in regions having rapid blood flow or wherein the tissue is moving.

Figure 4:
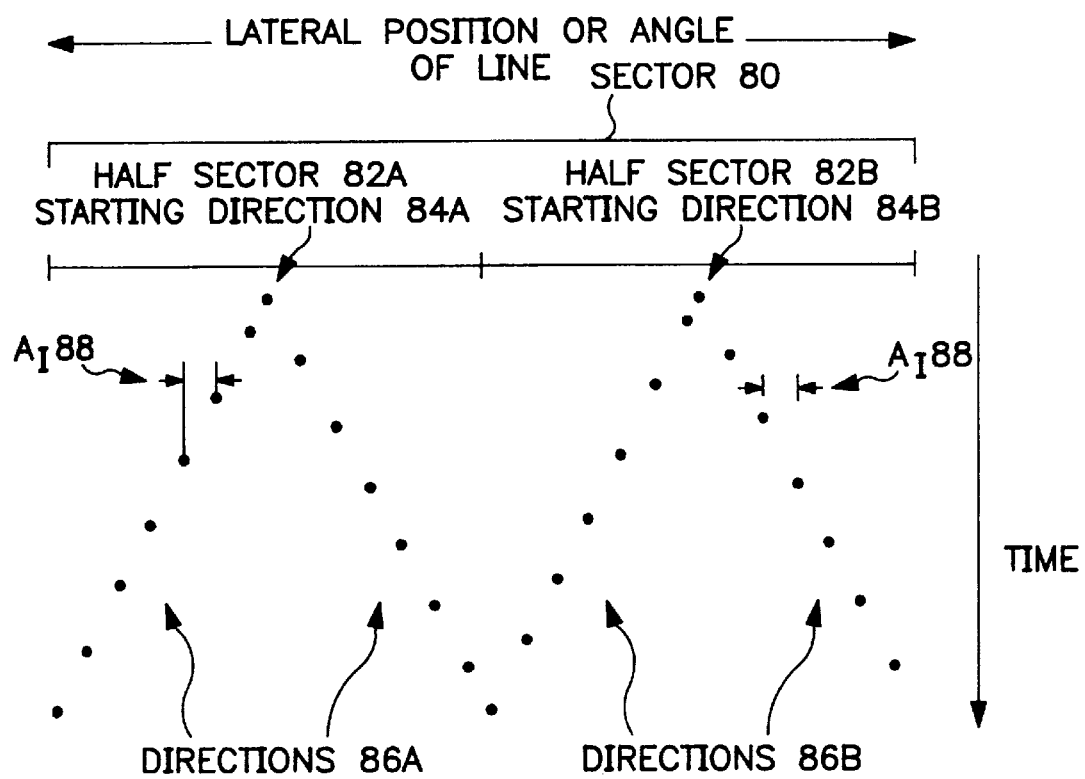

According to another aspect of the present invention, however, and as illustrated in FIG. 4, such gaps in the scanning can be reduced, or at least equalized over all regions of the sector, by controlling the spacing and sequence of acquisitions by each line. In the embodiment illustrated in FIG. 4, wherein each transmission line is indicated by an *, a Sector 80 having a predetermined total angular width is divided into two symmetric Half Sectors 82A and 82A and Transmitted Lines 74A and 74B are respectively assigned Starting Directions 84A and 84B wherein Starting Directions 84A and 84B are at the mid-ranges of, respectively, the angular widths of Half Sectors 82A and 82B. Thereafter, the angular Directions 86A and 86B of Transmitted Lines 74A and 74B are each alternately incremented and decremented by successive multiples N of an Angular Increment ($A_f$) 88 and, as indicated in FIG. 4, Transmitted Lines 74A and 74B are transmitted alternately in time.

The angular Directions 86A and 86B of each successive transmission of each of Transmitted Lines 74A and 74B is thereby alternately greater and less than Starting Directions 84A and 84B and the deviation of the angular Directions 86A and 86B of each successive transmission of Transmitted Lines 74A and 74B from Starting Directions 84A and 84B increases by Angular Increment ($A_f$) 88 on each successive transmission. As a result, this method reduces the maximum time interval between acquisitions that are spatially adjacent as the time intervals between successive transmissions along each direction are equalized and minimized, so that there are no unequal or larger than average gaps in the data collection along any of the transmission line directions in the sector and, as a result, no corresponding discontinuities in the data. By comparison, in systems not using this method multiple transmit operation would require nearly the entire frame interval between the center pair of adjacent lines.

It will be noted that the reverse of the scanning pattern described above will provide the same or an equivalent result. The pattern may also be expanded to three, four or more transmission lines by sub-dividing the sector correspondingly, that is, into three, four or more sub-sectors and scanning each sub-sector as described above, with corresponding adaptations in the timing of each transmission. Lastly, it should be noted that for certain applications, such as color flow mapping, each pair of transmissions in the scanning sequence will be comprised of a repetitive set of transmissions, referred to as a packet. In other applications, such as slow flow imaging, the packets may be interleaved among the scanning sequence, depending on the required or desired data rate, and in other applications the transmissions may be interleaved as described above. It will also be noted that the method is not limited to use only in color flow imaging systems, but may be applied in imaging systems generally where it is desired or necessary to increase the data acquisition rate.

Lastly, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

I claim:

1. In an ultrasonic imaging system including a transducer and signal generator with lineforming logic for forming transmitted lines of ultrasonic energy and, for each transmitted line, for receiving a plurality of parallel received lines containing information for generating images, and a processor for processing the received lines to generate the images, a method for attenuating parallel artifacts in acquired received lines containing information used in the generation of image data, comprising the steps of:
    (a) executing a plurality of line acquisitions wherein each line acquisition includes the transmission of a transmitted line and the receiving of a corresponding plurality of parallel received lines,
    (b) for each received line of each plurality of parallel received lines, generating a temporal moving average among receiving lines that are laterally and symmetrically transposed with respect to adjacent transmitted lines,
        wherein the temporal average for each received line represents the received line with an attenuated component from any parallel artifact present in the received line.

2. The method for acquiring received lines of claim 1, wherein in step (a) the line acquisitions are interleaved among a set of frames wherein each frame contains image data representing a volume of interest along a given angle of received lines and at a successive times and wherein the directions of the transmitted lines are interleaved among the set of frames and the direction of each plurality of parallel received lines is fixed with respect to a corresponding transmitted line.

3. The method for acquiring received lines of claim 1, wherein:
    the line acquisitions are organized among a set of frames wherein each frame contains image data representing a volume of interest along a given angle of received lines and at a successive times and wherein the directions of the transmitted lines are interleaved among the set of frames and the direction of each plurality of parallel received lines is fixed with respect to a corresponding transmitted line, and
    in step (a), a plurality of line acquisitions forming a packet of line acquisitions is performed for each of the frames in turn, and
    step (a) further includes
        (c) storing each of the line acquisitions is stored in a memory, and
        (d) reading the stored line acquisitions are read from the memory according to the sets of frames for use in the temporal filtering performed in step (b).

4. The method for acquiring received lines of claim 1, further comprising:
    (e) providing the temporal average of each received line to an image processor for generating the image.

5. The method for acquiring received lines of claim 1, wherein step (a) further comprises:
    (f) processing the received lines to generate image data wherein the image data is represented by processed received lines, and
    (g) using each processed received line for the generation for each processed received line of the temporal moving average among the corresponding laterally and symmetrically mirrored received lines according to step (b).

6. In an ultrasonic imaging system including a transducer and signal generator with lineforming logic for forming transmitted lines of ultrasonic energy and, for each transmitted line, for receiving a plurality of parallel received lines containing information for generating images, and a processor for processing the received lines to generate the images, a method for increasing the rate of acquisition of data used for the generation of image data in color flow imaging by increasing the rate of generation of transmitted lines, comprising the steps of:
    (a) executing a plurality of line acquisitions wherein each line acquisition includes the transmission of a plurality of transmitted lines at divergent angles and the receiving of at least one received line for and corresponding to each transmitted line,
    (b) storing the received lines of each of the line acquisitions in a memory, and
    (c) reading the stored received lines from the memory and providing the received lines to the processor for the generation of a color flow image in a spatial sequence determined by the angle of each received line.

7. The method for increasing the rate of acquisition of data used for the generation of image data in color flow imaging by increasing the rate of generation of transmitted lines of claim 6 for use in an ultrasonic imaging system having linear transmitting circuits, wherein step (a) further comprises the steps of:

(e) for each line acquisition, generating a summation of the plurality of transmitted lines, and (f) providing each summation of a plurality of transmitted lines to the transducer for concurrent transmission by the transducer.

8. The method for increasing the rate of acquisition of data used for the generation of image data in color flow imaging by increasing the rate of generation of transmitted lines of claim 6, wherein step (a) further comprises the steps of:

(e) for each line acquisition, generating a diverging and spatially separated plurality of transmitted lines by selecting a disjoint sub-aperture of the transducer for each transmitted line of the line acquisition wherein the disjoint sub-apertures of the transmitted lines are formed of non-overlapping sub-sets of transducer elements, (f) using each disjoint sub-aperture to transmit a corresponding transmitted line, and (g) receiving at least one corresponding received line.

9. The method for increasing the rate of acquisition of data used for the generation of image data in color flow imaging by increasing the rate of generation of transmitted lines of claim 6, wherein step (a) further comprises the steps of:

(e) for each line acquisition, generating a diverging and temporally separated plurality of transmitted lines by forming a transmission aperture formed of elements of the transducer wherein each transmission aperture is for and corresponds to a transmitted line of the line acquisition, (f) using each transmission aperture in a sequence to transmit the corresponding transmitted line of the line acquisition, and (g) concurrently forming a plurality of receiving apertures formed of elements of the transducer wherein each receiving aperture is for and corresponds to a received line of the line acquisition and receiving all received lines simultaneously wherein the data representing the received lines is received in the same sequence as the corresponding transmitted lines shifted in time by the interval between the transmissions of the transmitted lines.

10. The method for increasing the rate of acquisition of data used for the generation of image data in color flow imaging by increasing the rate of generation of transmitted lines of claim 6, wherein step (a) further includes a method for equalizing time intervals between acquisition of spatially adjacent lines, comprising the steps of:

(e) apportioning the total range of angles to be scanned by transmitted and received lines into a plurality of sub-sectors wherein each sub-sector corresponds to a transmitted line of the plurality of transmitted lines in each line acquisition so that a transmitted line is transmitted and the corresponding at least one received line is received in each sub-sector in each line acquisition, (f) in each line acquisition, transmitting a transmitted line and receiving the corresponding at least one received line in each sub-sector, wherein the initial line acquisition in each sub-sector is performed along a predetermined initial angle within the sub-sector, and (g) in each successive line acquisition, alternately incrementing and decrementing the angle of the transmitted line and the at least one received line in each sub-sector by a successive multiple of an angular increment until the total range of angles to be scanned have been scanned, thereupon returning to step (f).

11. The method for increasing the rate of acquisition of data used for the generation of image data in color flow imaging by increasing the rate of generation of transmitted lines of claim 6, wherein each line acquisition includes the transmission of a packet of line acquisitions, each packet of line acquisitions including the transmission of a plurality of transmitted lines at divergent angles and the receiving of the corresponding received lines.

12. In an ultrasonic imaging system including a transducer and signal generator with lineforming logic for forming transmitted lines of ultrasonic energy and, for each transmitted line, for receiving a plurality of parallel received lines containing information for generating images, and a processor for processing the received lines to generate the images, a method for increasing the rate of acquisition of data used for the generation of image data, comprising the steps of:

(a) interleaving line acquisitions among a set of frames wherein a plurality of line acquisitions are performed in each of the frames in turn with the line acquisitions being interleaved among the frames, (b) storing the line acquisitions with a frame set of the stored line acquisitions being updated during each frame, and (c) performing temporal averaging of the line acquisitions of the set of frames to generate successive images from the stored line acquisitions each time the line acquisitions are updated.

\* \* \* \* \*